(12) United States Patent
Suzuki et al.

(10) Patent No.: US 10,283,808 B2
(45) Date of Patent: May 7, 2019

(54) METHOD FOR PRODUCING ELECTRODE FOR LITHIUM ION BATTERIES

(71) Applicant: TOYOTA JIDOSHA KABUSHIKI KAISHA, Toyota-shi, Aichi-ken (JP)

(72) Inventors: Kazuhiro Suzuki, Toyota (JP); Eiji Orisaka, Nagoya (JP); Kazuyuki Onishi, Kawasaki (JP); Yuji Shibata, Kawasaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/896,417

(22) PCT Filed: Jun. 26, 2014

(86) PCT No.: PCT/JP2014/067035
§ 371 (c)(1),
(2) Date: Dec. 7, 2015

(87) PCT Pub. No.: WO2014/208684
PCT Pub. Date: Dec. 31, 2014

(65) Prior Publication Data
US 2016/0141715 A1 May 19, 2016
US 2018/0183092 A2 Jun. 28, 2018

(30) Foreign Application Priority Data
Jun. 27, 2013 (JP) ................................. 2013-134396

(51) Int. Cl.
*H01M 4/04* (2006.01)
*H01M 10/0525* (2010.01)
*H01M 4/139* (2010.01)

(52) U.S. Cl.
CPC ....... *H01M 10/0525* (2013.01); *H01M 4/043* (2013.01); *H01M 4/0404* (2013.01);
(Continued)

(58) Field of Classification Search
USPC .......................... 427/115, 180, 355, 359, 369
See application file for complete search history.

(56) References Cited

U.S. PATENT DOCUMENTS 4,556,595 A * 12/1985 Ochi .......................... C09J 7/00
428/143
6,476,487 B2 * 11/2002 Kuramoto ............ B23K 3/0623
228/224

(Continued)

FOREIGN PATENT DOCUMENTS

JP      5-212321 A     8/1993
JP      11-73947 A     3/1999
(Continued)

OTHER PUBLICATIONS

International Preliminary Report on Patentability dated Dec. 29, 2015 issued in corresponding Application No. PCT/JP2014/067035.
(Continued)

*Primary Examiner* — Brian K Talbot
(74) *Attorney, Agent, or Firm* — Sughrue Mion, PLLC

(57) ABSTRACT

A binder layer formation step of forming a binder layer of which an initial sticking strength of a surface is 1 or more on a current collector; a sticking step of sticking a powder having an angle of repose of 45° or less onto the surface of the binder layer by bringing the powder into contact with the surface; and a compression step of compressing the powder stuck in the sticking step into a predetermined density are included.

4 Claims, 3 Drawing Sheets

(52) U.S. Cl.
CPC ....... *H01M 4/0416* (2013.01); *H01M 4/0435* (2013.01); *H01M 4/139* (2013.01)

(56) References Cited

U.S. PATENT DOCUMENTS

| | | | |
|---|---|---|---|
| 9,159,986 B2* | 10/2015 | Uchida | H01M 4/0404 |
| 2002/0071913 A1* | 6/2002 | Jen | H01M 4/0402 |
| | | | 427/299 |
| 2003/0231004 A1* | 12/2003 | Takahashi | H01M 4/0404 |
| | | | 320/117 |
| 2005/0031959 A1* | 2/2005 | Kato | H01M 4/24 |
| | | | 429/232 |
| 2006/0114643 A1* | 6/2006 | Mitchell | H01G 11/42 |
| | | | 361/502 |
| 2007/0055023 A1* | 3/2007 | Han | H01M 4/622 |
| | | | 525/329.7 |
| 2008/0030924 A1* | 2/2008 | Mori | H01G 11/38 |
| | | | 361/502 |
| 2009/0004597 A1* | 1/2009 | Ueoka | C03C 3/066 |
| | | | 430/270.1 |
| 2009/0127110 A1* | 5/2009 | Teramoto | B22F 1/0062 |
| | | | 204/298.41 |
| 2009/0224198 A1* | 9/2009 | Mori | H01M 4/0404 |
| | | | 252/62.3 Q |
| 2012/0121988 A1* | 5/2012 | Lee | H01M 4/133 |
| | | | 429/231.8 |
| 2012/0189913 A1* | 7/2012 | Wakizaka | H01M 4/133 |
| | | | 429/211 |
| 2013/0069598 A1* | 3/2013 | Tanaka | H01M 10/0525 |
| | | | 320/134 |
| 2014/0205532 A1* | 7/2014 | Takeuchi | H01M 4/587 |
| | | | 423/448 |

FOREIGN PATENT DOCUMENTS

| | | |
|---|---|---|
| JP | 2003-317707 A | 11/2003 |
| JP | 2008-251965 A | 10/2008 |
| JP | 2011-96831 A | 5/2011 |
| JP | 2011-216504 A | 10/2011 |
| WO | 2011/013756 A1 | 2/2011 |

OTHER PUBLICATIONS

International Search Report for PCT/JP2014/067035 dated Aug. 5, 2014.

* cited by examiner

METHOD FOR PRODUCING ELECTRODE FOR LITHIUM ION BATTERIES

CROSS REFERENCE TO RELATED APPLICATIONS

This application is a National Stage of International Application No. PCT/JP2014/067035 filed Jun. 26, 2014, claiming priority based on Japanese Patent Application No. 2013-134396 filed Jun. 27, 2013, the contents of all of which are incorporated herein by reference in their entirety.

TECHNICAL FIELD

The present invention relates to a method for producing an electrode for a lithium ion battery in which a powder containing an electrode active material and the like is compression-molded to form an electrode for a lithium ion battery.

BACKGROUND ART

A further increase in the demand for a lithium ion battery that is compact and lightweight, has a high energy density, and is capable of repeatedly charging and discharging is expected even in view of environmental concerns. The lithium ion battery has high energy density and thus is used in the fields of a cellular phone, a notebook-sized personal computer, or the like, however, along with the expansion or development of the use, further improvement of the performance, such as reduction of the resistance, increase of the capacity, and the like is required.

An electrode for a lithium ion battery can be obtained as an electrode sheet. For example, Patent Literature 1 discloses a powder rolling apparatus in which a powder supplied between rolls of a pair of rolls for press is continuously compression-molded on a current collector by the pair of rolls for press to obtain an electrode sheet. Further, Patent Literature 2 discloses that an electrified electrode material is stuck onto a current collector, and the current collector and the powder are adhered to each other by pressurizing with a pair of heating rolls to obtain an electrode sheet.

CITATION LIST

Patent Literature

Patent Literature 1: JP 2008-251965 A
Patent Literature 2: JP 2011-96831 A

SUMMARY OF INVENTION

Technical Problem

However, in a case where an electrode sheet is prepared by using the above-described powder rolling apparatus, it was difficult to ensure the linearity of the edge part of the electrode sheet because the powder flows to the outside in the nip part between rolls by the rotation of rolls and the gravity. Further, in a case where an electrode material is electrified and stuck onto a current collector, when the electrification of a powder is insufficient, the powder is not stuck onto a current collector, and further even if the electrification is sufficient, particles of the powder may be piled up each other, unevenness is generated in the thickness of the electrode, and accordingly decrease of the performance of the lithium ion battery has been caused. In addition, a charge control agent is mixed into a powder in order to electrify the powder, and also according to the increase of the internal resistance by the charge control agent, the decrease of the performance of the lithium ion battery has been caused.

Further, as a method of sticking a powder that is an electrode material onto a current collector, a method in which a binder having a tackiness at normal temperature is applied onto a current collector, and a powder is stuck onto the applied current collector via the binder may be considered, however, accuracy of the powder weight per unit area is dependent on the fluidity of the powder, and it was difficult to obtain an electrode active material layer having favorable accuracy.

An object of the present invention is to produce an electrode for a lithium ion battery, which is a thin film electrode having a smooth surface and has improved performance.

Solution to Problem

As a result of intensive studies, the present inventors have found that the above-described object can be achieved by applying a binder on a surface of a current collector, then sticking a powder having a certain fluidity onto a part of the current collector where the binder has been applied, and compressing the current collector and the powder, and thus have completed the present invention.

That is, according to the present invention,
(1) A method for producing an electrode for a lithium ion battery, containing: a binder layer formation step of forming a binder layer of which an initial sticking strength of a surface is 1 or more on a current collector; a sticking step of sticking a powder having an angle of repose of 45° or less onto the surface of the binder layer by bringing the powder into contact with the surface; and a compression step of compressing the powder stuck in the sticking step into a predetermined density;
(2) The method for producing an electrode for a lithium ion battery described in (1), in which the powder is stuck by a dip method using a powder container in the sticking step;
(3) The method for producing an electrode for a lithium ion battery described in (1), in which the powder is stuck by a powder spray method using air in the sticking step;
(4) The method for producing an electrode for a lithium ion battery described in any one of (1) to (3), in which the powder has a degree of compression of 40% or less;
(5) The method for producing an electrode for a lithium ion battery described in any one of (1) to (4), in which the binder layer formed on the current collector has a thickness of 0.1 to 5 μm; and
(6) The method for producing an electrode for a lithium ion battery described in any one of (1) to (5), in which the powder is a composite particle obtained by granulating a component containing an electrode active material and a binding material;
are provided.

Advantageous Effects of Invention

According to the present invention, an electrode for a lithium ion battery, which is a thin film electrode having a smooth surface, and has improved performance, can be produced.

DESCRIPTION OF EMBODIMENTS

Figure 1:
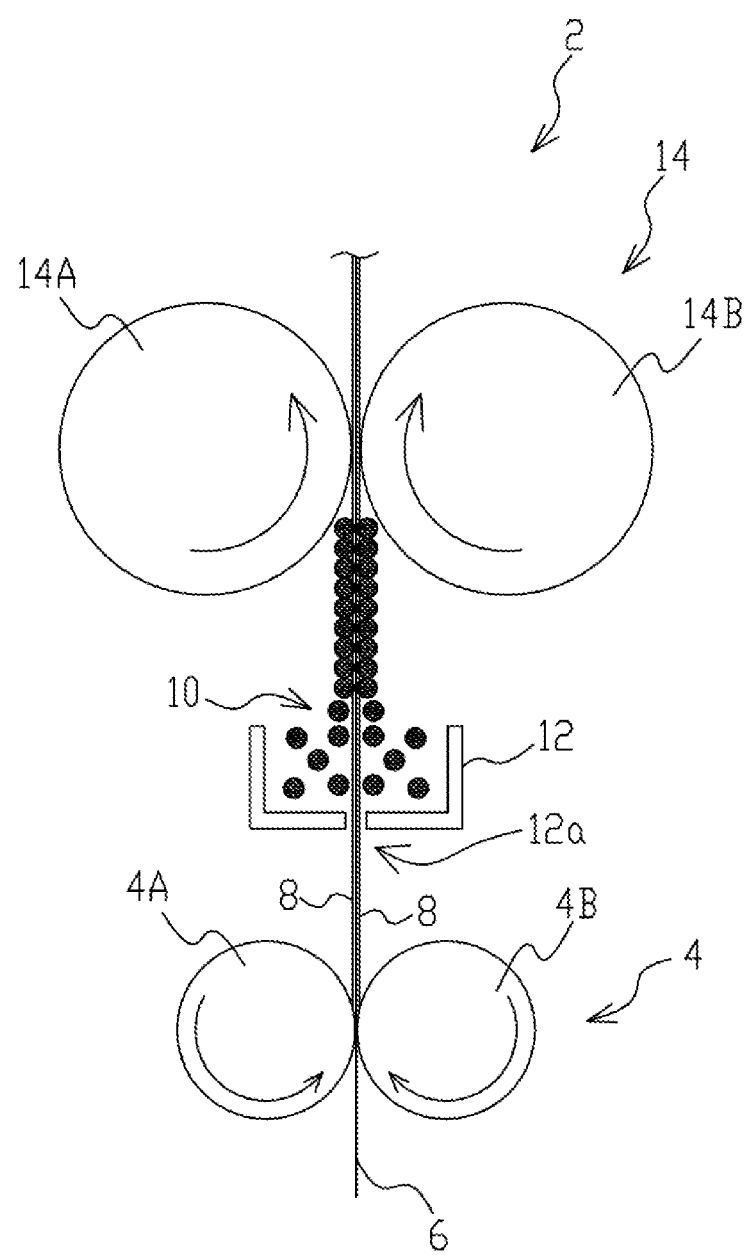
FIG. 1 is a schematic diagram showing a powder molding device according to the first embodiment.

Hereinafter, a method for producing an electrode for a lithium ion battery according to the first embodiment of the present invention will be explained with reference to drawings. FIG. 1 is a schematic diagram showing a powder molding device 2 used for producing an electrode for a lithium ion battery according to the first embodiment. As shown in FIG. 1, the powder molding device 2 is provided with binder applying rolls 4 having a pair of rolls 4A and 4B of which rotation axes are arranged horizontally and parallel to each other, and with which a binder is applied to a current collector 6; a powder storage tank 12 that is arranged in the upward direction of the binder applying rolls 4, and stores the powder 10 composed of a composite particle obtained by granulating a component containing an electrode active material and a binding material; and compression rolls 14 having a pair of rolls 14A and 14B of which rotation axes are arranged horizontally and parallel to each other, which are arranged in the upward direction of the powder storage tank 12, and with which the powder 10 stuck onto the current collector 6 is compressed into a predetermined density.

A binder is supplied onto surfaces of the rolls 4A and 4B of the binder applying rolls 4 from a binder supply part that is not shown. On the bottom of the powder storage tank 12, an opening 12a through which a current collector 6 passes is provided. The powder 10 stored in the powder storage tank 12 has an angle of repose of 45° or less, and preferably 40° or less, and a degree of compression of preferably 40% or less, and more preferably 30% or less. Note that, the lower limit of the angle of repose of the powder 10 is preferably 20° or more, and the lower limit of the degree of compression is preferably 5% or more.

Here, the angle of repose of the powder 10 is measured by a known method such as an injection method, an ejection method, or a gradient method. Further, the degree of compression of the powder 10 is defined by Degree of compression=(packed bulk density−loose bulk density)/packed bulk density×100(%)

Further, the angle of repose and the degree of compression of the powder 10 can be measured by using, for example, a powder physical property measuring apparatus such as POWDER TESTER PT-S manufactured by Hosokawa Micron Corporation.

In a case where an electrode sheet is prepared as an electrode for a lithium ion battery by using the powder molding device 2, production of an electrode for a lithium ion battery is performed by pulling up the current collector 6 in the upward direction from below, sticking the powder 10 in the powder storage tank 12 onto the current collector 6 by a dip method, and compressing the powder 10 stuck onto the current collector 6 by compression rolls 14. That is, in this powder molding device 2, while the current collector 6 passes between rolls 4A and 4B of the binder applying rolls 4, a binder is applied onto both surfaces of the current collector 6 by the rolls 4A and 4B, and a binder layer 8 having adhesiveness at normal temperature is formed. That is, a binder layer 8 of which an initial sticking strength of the surface is 1 or more, and preferably 1 to 10 is formed. Here, the initial sticking strength of the surface of the binder layer 8 is obtained by the measurement at normal temperature by an initial sticking strength test (inclination angle of 20°) prescribed in JIS Z 0237. The initial sticking strength of the surface of the binder layer can be adjusted by changing the glass transition temperature (Tg) of the binder, or by changing the kind or amount of a monomer constituting the binder.

Note that, the thickness of the binder layer 8 to be formed onto the current collector 6 by binder applying rolls 4 is preferably 0.1 to 5 µm, and is around one tenth of the average particle diameter of the powder 10. By setting the thickness of the binder layer 8 in this range, the powder 10 is uniformly stuck onto the surface of the current collector 6 without unevenness. Further, since the applying amount of the binder is small, the drying is easily performed, and the binder layer can be dried during the conveyance of the current collector 6.

The current collector 6 on which a binder layer 8 has formed passes through the powder storage tank 12 via the opening 12a of the powder storage tank 12. At this moment, the powder 10 brought into contact with the binder layer 8 that has formed on the current collector 6 sticks to the current collector 6 by only the contact. Further, particles of the powder 10 accumulated so as to be caught between the particles of powder 10 fall by gravity. Accordingly, the powder 10 is uniformly stuck onto the surface of the current collector 6 without unevenness. Here, the powder 10 stuck onto the current collector 6 has already been bonded to the current collector 6 at a predetermined adhesive strength before the compression by compression rolls 14, which is a post-process, therefore, even while the current collector 6 is pulled up in the perpendicular direction that is the transportation direction, the current collector 6 can be in a state where a certain amount of the powder 10 is stuck. Further, the powder 10 stuck onto the current collector 6 is compressed into a predetermined density by compression rolls 14. As a result, the production of an electrode for a lithium ion battery in a sheet shape is completed.

Figure 2:
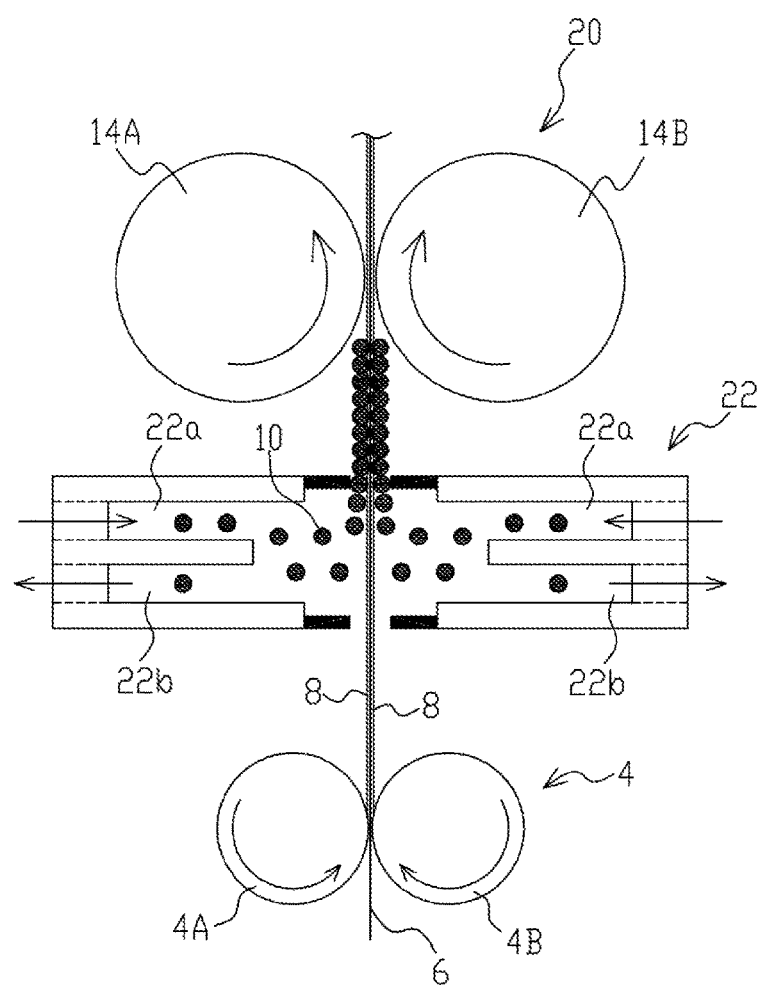
FIG. 2 is a schematic diagram showing a powder molding device according to the second embodiment.
Figure 3:
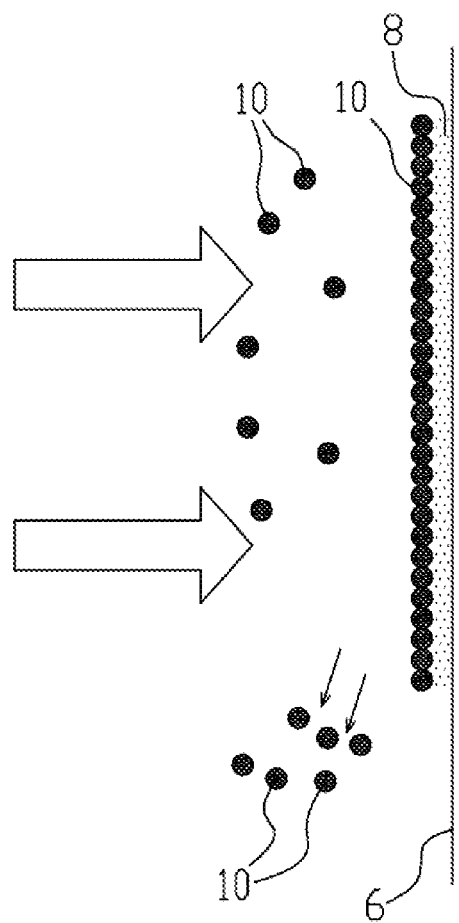
FIG. 3 is a diagram showing a state that a powder is stuck onto a current collector according to the second embodiment.

Next, a method for producing an electrode for a lithium ion battery according to the second embodiment of the present invention will be explained with reference to FIG. 2 and FIG. 3. FIG. 2 is a schematic diagram showing a powder molding device 20 used for producing an electrode for a lithium ion battery according to the second embodiment. The powder molding device 20 shown in FIG. 2 is provided with a powder spray part 22 in place of the powder storage tank 12 of the powder molding device 2 according to the first embodiment shown in FIG. 1, and with which the powder 10 is stuck onto the current collector 6 by a powder spray method using air. Therefore, the detailed descriptions of the same constitutions as those of the first embodiment are not repeated, and the same constitutions as those of the first embodiment will be explained by giving the same reference signs.

The powder spray part 22 is provided with a storage part that stores the powder 10, which is not shown. Further, on the internal upper side of the powder spray part 22, a spraying part 22a is provided in which the powder 10 in the storage part is sprayed on both surfaces of the current collector 6 by air, and a suction part 22b is provided on the lower side in which the powder 10 not stuck onto the current collector 6 in the powder being sprayed onto the current collector 6 is sucked for collection.

Therefore, while the current collector 6 onto which a binder layer 8 has formed by binder applying rolls 4 passes through the powder spray part 22, the powder 10 sprayed by the powder spray part 22 sticks onto both surfaces of the current collector 6. Here, as shown in FIG. 3, even when the powder 10 is further sprayed onto the part of the current collector 6 where the powder 10 has stuck onto, the powder 10 does not stick onto the current collector 6 but falls. Accordingly, the powder 10 is uniformly stuck onto the surface of the current collector 6 without unevenness. The current collector 6 passed through the powder spray part 22 is compressed by compression rolls 14, as a result of which the production of an electrode for a lithium ion battery in a sheet shape is completed.

According to the method for producing an electrode for a lithium ion battery according to each of the embodiments described above, since the angle of repose of the powder 10 is 45° or less, and preferably 40° or less, and the degree of compression is preferably 40% or less, and more preferably 30% or less, the powder 10 can be uniformly stuck onto the surface of current collector 6 without unevenness, therefore, an electrode active material layer having a constant thickness can be obtained without requiring any charging control and the like. Therefore, an electrode for a lithium ion battery, which is a thin film electrode having a smooth surface, and has improved performance, can be produced.

Further, in the first embodiment, the powder 10 is stuck onto the current collector 6 by a dip method, and in the second embodiment, the powder 10 is stuck onto the current collector 6 by a powder spray method. However, the dip method is excellent in the application efficiency, on the other hand, the powder spray method can control the sticking amount with higher precision, and the film thickness precision of the resulting electrode active material layer can be improved.

Note that, since the amount of the binder to apply to the current collector 6 is small in the present invention, a step of drying the binder layer 8 formed onto the current collector 6 is not provided, however, a step of drying the binder layer 8 may be provided after sticking the powder 10 onto the binder layer 8.

Further, a function to make the adhesive strength even stronger may also be added to the binder layer 8 by heating and melting the binder layer 8 with the heating during the compression by compression rolls 14 in the compression step.

The current collector 6 used in the present invention may be a base material in a thin film form, and the thickness is preferably 1 to 1000 μm, and more preferably 5 to 800 μm. Examples of the current collector 6 include a metal foil of aluminum, platinum, nickel, tantalum, titanium, stainless steel, copper, other alloys, or the like, or carbon, a conductive polymer, paper, natural fiber, polymer fiber, fabric, and a polymer resin film, and the current collector 6 can be appropriately selected from these depending on the intended purpose. Examples of the polymer resin film include a polyester resin film such as polyethylene terephthalate and polyethylene naphthalate, a plastic film or sheet that is constituted by containing polyimide, polypropylene, polyphenylene sulfide, polyvinyl chloride, aramid film, PEN, or PEEK.

Among them, in a case where an electrode sheet is produced as an electrode for a lithium ion battery, as the current collector 6, a metal foil, carbon, or a conductive polymer may be used, and a metal foil is preferably used. Among them, from viewpoints of the conductivity and the voltage resistance, a metal foil of copper, aluminum, or an aluminum alloy is preferably used. Further, on the surface of the current collector 6, a treatment such as a coating film treatment, drilling, buffing, sandblasting, and/or etching may be performed.

The binder used in the present invention is not particularly limited as long as the initial sticking strength of a surface of a binder layer is 1 or more when the binder layer is formed. Among them, the preferable binder is mainly composed of a polymer containing a (meth)acrylonitrile unit, a butadiene unit, and an ethylenically unsaturated carboxylic acid unit. The (meth)acrylonitrile unit is a repeating unit derived from (meth)acrylonitrile. Here, the (meth)acrylonitrile is used in the meaning of containing both acrylonitrile and meth acrylonitrile. That is, the (meth)acrylonitrile may be either one of acrylonitrile and meth acrylonitrile, or may be the one containing both of the acrylonitrile and meth acrylonitrile at the same time. Further, the butadiene unit is a repeating unit derived from butadiene.

The ethylenically unsaturated carboxylic acid unit is a repeating unit derived from ethylenically unsaturated carboxylic acid. Examples of the ethylenically unsaturated carboxylic acid include mono- or dicarboxylic acid (anhydride) such as acrylic acid, methacrylic acid, crotonic acid, maleic acid, fumaric acid, and itaconic acid, and these can be used alone or in combination of two or more kinds thereof.

Further, in the binder, a repeating unit derived from another monomer copolymerizable with these monomers may also be contained in addition to the repeating unit derived from the above-described monomers.

In the polymer constituting a binder, the (meth)acrylonitrile unit is contained in a ratio of preferably 10 to 60% by mass, more preferably 20 to 60% by mass, and particularly preferably 20 to 45% by mass, the butadiene unit is contained in a ratio of preferably 35 to 85% by mass, more preferably 40 to 75% by mass, and particularly preferably 45 to 75% by mass, and the ethylenically unsaturated carboxylic acid unit is contained in a ratio of preferably 0.5 to 10% by mass, and more preferably 1 to 10% by mass.

In the present invention, when the unit amount of the (meth)acrylonitrile exceeds 60% by mass, the flexibility of a polarizable electrode is lowered, and the internal resistance is increased. On the other hand, when the unit amount of the (meth)acrylonitrile is less than 10% by mass, the internal resistance is increased, and the electrode strength is decreased. When the unit amount of the butadiene exceeds 85% by mass, the internal resistance is increased, and the handling capability is deteriorated. On the other hand, when the unit amount of the butadiene is less than 35% by mass, the adhesive strength and the flexibility are decreased. When the unit amount of the ethylenically unsaturated carboxylic acid exceeds 10% by mass, the internal resistance is increased. On the other hand, when the unit amount of the ethylenically unsaturated carboxylic acid is less than 0.5% by mass, the electrode strength is lowered.

Further, a repeating unit derived from a monomer other than the (meth)acrylonitrile, the butadiene, and the ethylenically unsaturated carboxylic acid may be contained in a ratio of preferably 54.5% by mass or less, more preferably 39% by mass or less, and particularly preferably 34% by mass or less, or may not be contained in the polymer.

As the production method of the binder, it is not particularly limited, and a known polymerization method such as an emulsion polymerization method, a suspension polymerization method, a dispersion polymerization method, or a solution polymerization method, using a composition containing each monomer at a predetermined ratio, can be employed. Among them, it is preferred to produce the binder by an emulsion polymerization method because the particle diameter of the binder is easily controlled. In particular, a water-based polymerization method using water as the main solvent is preferred.

Examples of the powder 10 used in the present invention include a composite particle containing an electrode active material. The composite particle contains an electrode active material and a binding material, and may contain other dispersing agents, electroconductive materials and additives as needed.

In a case where the composite particle is used as an electrode material for a lithium ion battery, examples of the active material for a positive electrode include a metal oxide capable of reversibly doping and dedoping lithium ions. Examples of the metal oxide include, for example, a lithium cobalt oxide, a lithium nickel oxide, a lithium manganate oxide, and a lithium iron phosphate oxide. Note that, the positive electrode active material mentioned in the above may be used alone, or may also be used by mixing a plurality of kinds thereof appropriately depending on the application.

Note that, examples of the active material for a negative electrode as the counter electrode of a positive electrode for a lithium ion battery include low crystalline carbon (amorphous carbon) such as easily graphitizable carbon, hardly graphitizable carbon, and pyrolytic carbon, graphite (natural graphite, and artificial graphite), an alloy-base material of tin, silicon, or the like, and an oxide such as a silicon oxide, a tin oxide, and a lithium titanate. Note that, the electrode active material mentioned in the above may be used alone, or may also be used by mixing a plurality of kinds thereof appropriately depending on the application.

As the shape of the electrode active material for the electrode for a lithium ion battery, the one granulated to a granular shape is preferred. When the shape of the particle is a spherical shape, an electrode having a higher density can be formed at the time of molding the electrode.

The volume average particle diameter of the electrode active material for the electrode for a lithium ion battery is usually 0.1 to 100 μm, preferably 0.5 to 50 μm, and more preferably 0.8 to 30 μm in each of the positive electrode and negative electrode.

The binding material used for a composite particle is not particularly limited as long as the binding material can bind the electrode active materials to each other. A preferable binding material is a dispersion type binding material having a nature of dispersing in a solvent. Examples of the dispersion type binding material include, for example, a polymer compound such as a silicon-based polymer, a fluorine-containing polymer, a conjugated diene-based polymer, an acrylate-based polymer, polyimide, polyamide, or polyurethane, and preferably a fluorine-based-containing polymer, a conjugated diene-based polymer, and an acrylate-based polymer, and more preferably a conjugated diene-based polymer, and an acrylate-based polymer.

The shape of the dispersion type binding material is not particularly limited, but is preferably particulate. By being particulate, an excellent binding property is obtained, and it is possible to suppress reduction in a capacity of a manufactured electrode, and deterioration of the electrode due to the repetition of charging and discharging. Examples of the particulate binding material include the one in a state that particles of a binding material are dispersed in water, such as latex, or the particulate one, which is obtained by drying such a dispersion.

The amount of the binding material is, on a dry weight basis, usually 0.1 to 50 parts by weight, preferably 0.5 to 20 parts by weight, and more preferably 1 to 15 parts by weight with respect to 100 parts by weight of the electrode active material, from viewpoints of being able to sufficiently secure adhesion between the resulting electrode active material layer and the current collector, and to lower internal resistance.

For the composite particle, a dispersing agent may be used as needed as described above. Specific examples of the dispersing agent include a cellulose-based polymer such as carboxymethyl cellulose, methyl cellulose, and an ammonium salt or alkali metal salt thereof. These dispersing agents can be used alone or in combination of two or more kinds thereof.

For the composite particle, an electroconductive material may be used as needed as described above. Specific examples of the electroconductive material include carbon black such as furnace black, acetylene black, and Ketjen black (registered trademark of Akzo Nobel Chemicals International B.V.). Among them, acetylene black and Ketjen black are preferred. These electroconductive materials can be used alone or in combination of two or more kinds thereof.

The composite particle is obtained by granulating using an electrode active material, a binding material, and other components such as the above-described electroconductive material, which are added as needed, and contains at least an electrode active material and a binding material. Each of the above-described ones is not present as an individually independent particle, and two or more components including an electrode active material and a binding material as constituting components are formed into a particle. Specifically, a plurality of individual particles of the two or more components is combined to each other to be formed into a secondary particle, and the one in which a plurality of (preferably several to several dozen) electrode active materials is bound by a binding material to be formed into a particle is preferred.

The production method of the composite particle is not particularly limited, and can be produced by a known granulation method such as a fluidized bed granulation method, a spray drying granulation method, and a rolling bed granulation method.

The volume average particle diameter of the composite particle is in the range of usually 0.1 to 1000 μm, preferably 1 to 500 μm, and more preferably 30 to 250 μm, from a viewpoint of easily obtaining an electrode active material layer having an intended thickness.

Note that, the average particle diameter of the composite particle is a volume average particle diameter calculated by the measurement using a laser diffraction type particle size distribution measuring apparatus (for example, SALD-3100 manufactured by Shimadzu Corporation). Note that, in a case where the composite particle is used as the powder 10, by increasing the average particle diameter of the composite particles, the angle of repose, and the degree of compression can be decreased.

EXAMPLES

Hereinafter, the present invention will be specifically described by indicating Examples, however, the present invention should not be limited to the following Examples, and can be arbitrarily changed and carried out without departing from the gist of the present invention, and the range of equivalency.

In Examples and Comparative Examples, measurements of the initial sticking strength, the angle of repose, and the degree of compression were performed as follows.

(Initial Sticking Strength)

In accordance with JIS Z 0237, and JIS Z 8703, a binder layer having a length of 10 cm was stuck onto an inclined surface of a stainless steel plate at an inclination angle of 20° at normal temperature (5 to 35° C.), and steel balls having 30 kinds of sizes in diameter of 1/32 to 32/32 inch were rolled at an initial velocity of zero from a position 10 cm from the upper side of the inclined surface. The size in a maximum diameter at which the ball stopped on the binder layer was expressed by the ball number, and set as the initial sticking strength.

(Production of Composite Particle)

As the negative electrode active material, 97 parts of artificial graphite (the volume average particle diameter of 24.5 μm, and the distance between graphite layers (plane interval of (002) plane (d value) by an X-ray diffraction method) of 0.354 nm), and 1.5 parts of a carboxymethyl cellulose sodium salt, and as the binding material, 1.5 parts of BM-400B (manufactured by ZEON CORPORATION) in terms of solid content, were mixed, and further, ion exchanged water was added into the resultant mixture so that the solid content concentration was 20%, and mixed and dispersed to obtain a slurry for composite particles. Further, the obtained slurry for composite particles were subjected to spray drying granulation by a spray dryer (manufactured by OHKAWARA KAKOHKI CO., LTD.) using a rotary disk type atomizer (65 mm in diameter), and the rotational speed of the atomizer, the hot air temperature, and the temperature of the particle recovery exit were adjusted, as a result of which composite particles for a negative electrode having an average particle diameter of 60 μm were obtained. The particles were used as the powder 10 described below. Note that, when the spray drying granulation was performed, the rotational speed of the atomizer, the hot air temperature, and the temperature of the particle recovery exit were adjusted, as a result of which the angle of repose and degree of compression of the powder 10 were adjusted.

(Angle of Repose and Degree of Compression)

The angle of repose and degree of compression of the powder 10 were measured by using POWDER TESTER PT-S manufactured by Hosokawa Micron Corporation in accordance with a conventional method.

Example 1

As shown in Table 1, an acrylic-based binder having a glass transition temperature (Tg) of −20° C. was applied onto a current collector 6 and dried to form 2 μm of a binder layer having an initial sticking strength of 4, and onto which a powder 10 having an angle of repose of 32.1° and a degree of compression of 17.6% was stuck by a dip method using a powder storage tank 12 by using a powder molding device 2 shown in FIG. 1, the stuck powder 10 was compressed at 10 kN/cm using compression rolls 14 to prepare an electrode sheet. When the powder weight per unit area of the current collector 6 was measured, it was 4.9 mg/cm², and when the surface state was observed, it was favorable.

Example 2

As shown in Table 1, an acrylic-based binder having a glass transition temperature (Tg) of −20° C. was applied onto a current collector 6 and dried to form 2 μm of a binder layer having an initial sticking strength of 4, and onto which a powder 10 having an angle of repose of 32.1° and a degree of compression of 17.6% was stuck by a powder spray method using air by using a powder molding device 20 shown in FIG. 2, the stuck powder 10 was compressed at 10 kN/cm using compression rolls 14 to prepare an electrode sheet. When the powder weight per unit area of the current collector 6 was measured, it was 4.9 mg/cm², and when the surface state was observed, it was favorable.

TABLE 1

|  | Ex. 1 | Ex. 2 | Comp. Ex. 1 | Comp. Ex. 2 |
| --- | --- | --- | --- | --- |
| Initial sticking strength | 4 | 4 | <1 | 4 |
| Angle of repose | 32.1° | 32.1° | 32.1° | 45.6° |
| Degree of compression | 17.6% | 17.6% | 17.6% | 33.0% |
| Weight per unit area | 4.9 mg/cm² | 4.9 mg/cm² | 0.7 mg/cm² | 4.0 mg/cm² |
| Surface state | ○(Favorable) | ○(Favorable) | X (Generation of lack of hiding) | X (Generation of lumps) |

Comparative Example 1

As shown in Table 1, an acrylic-based binder having a glass transition temperature (Tg) of −40° C. was applied onto a current collector 6 and dried to form 2 μm of a binder layer having an initial sticking strength of less than 1, and onto which a powder 10 having an angle of repose of 32.1° and a degree of compression of 17.6% was stuck by a dip method using a powder storage tank 12 by using a powder molding device 2 shown in FIG. 1, the stuck powder 10 was compressed at 10 kN/cm using compression rolls 14 to prepare an electrode sheet. When the powder weight per unit area of the current collector 6 was measured, it was 0.7 mg/cm², and when the surface state was observed, lack of hiding was generated. Note that, the lack of hiding means that the surface of the current collector is exposed because of the thin thickness of the electrode.

Comparative Example 2

As shown in Table 1, an acrylic-based binder having a glass transition temperature (Tg) of −20° C. was applied onto a current collector 6 and dried to form 2 μm of a binder layer having an initial sticking strength of 4, and onto which a powder 10 having an average particle diameter of 40 μm, an angle of repose of 45.6°, and a degree of compression of 33.0% was stuck by a dip method using a powder storage tank 12 by using a powder molding device 2 shown in FIG. 1, the stuck powder 10 was compressed at 10 kN/cm using compression rolls 14 to prepare an electrode sheet. When the powder weight per unit area of the current collector 6 was measured, it was 4.0 mg/cm², and when the surface state was observed, lumps were generated. Note that, the lumps means that an aggregate of the powder is present on a surface of an electrode, and the film thickness or the weight per unit area is partially increased. Note that, the angle of repose and the degree of compression of the powder 10 were adjusted by the adjustment of the rotational speed of the atomizer, the hot air temperature, and the temperature of the particle recovery exit when the spray drying granulation was performed.

The invention claimed is:

1. A method for producing an electrode for a lithium ion battery, comprising:

a binder layer formation step of forming a binder layer on a current collector, the binder layer including a surface having an initial sticking strength indicated by a ball number of 1 or more, wherein the ball number of 1 or more has a diameter of at least 1/32 inch, wherein the binder layer includes a binder, the binder being mainly composed of a polymer containing a (meth)acrylonitrile unit, a butadiene unit, and an ethylenically unsaturated carboxylic acid unit;

a sticking step of sticking a powder having an angle of repose of 45° or less onto the surface of the binder layer by bringing the powder into contact with the surface; and a compression step of compressing the powder stuck in the sticking step, wherein the initial sticking strength of the binder layer is determined by a test comprising:

sticking the binder layer having a length of 10 cm onto an inclined surface of a stainless steel plate at an inclination angle of 20° and having a temperature of 5 to 35° C.;

rolling steel balls, having different diameter sizes, at an initial velocity of zero from a position 10 cm from an upper side of the inclined surface; and determining, from among the steel balls, a largest diameter steel ball that stopped on the binder layer, in order to obtain the initial sticking strength of the binder layer wherein said powder has a degree of compression of 40% or less and the binder layer formed on the current collector has a thickness of 0.1 to 5 um.

2. The method for producing an electrode for a lithium ion battery according to claim 1, wherein the powder is stuck by a dip method using a powder container in the sticking step.

3. The method for producing an electrode for a lithium ion battery according to claim 1, wherein the powder is stuck by a powder spray method using air in the sticking step.

4. The method for producing an electrode for a lithium ion battery according to claim 1, wherein the powder is a composite particle obtained by granulating a component containing an electrode active material and a binding material.

* * * * *